May 25, 1965   E. L. BEATTY   3,184,987

MOTION-TRANSMITTING DEVICE

Filed Aug. 31, 1961

INVENTOR.
ELDON L. BEATTY

BY
Kenneth E. Walden
ATTORNEY

United States Patent Office 3,184,987
Patented May 25, 1965

3,184,987
MOTION-TRANSMITTING DEVICE
Eldon L. Beatty, Lansing, Ill., assignor to The Anderson Company, a corporation of Indiana
Filed Aug. 31, 1961, Ser. No. 135,203
8 Claims. (Cl. 74—424.8)

This invention relates to a motion-transmitting device and more particularly to a device for connecting rotary motion to translatory motion or vice versa.

In conventional motion-transmitting devices a nut unit, including antifriction bearings or load-transmitting elements, is engaged with a threaded shaft whereby relative rotation between the nut and shaft will produce relative axial movement of said nut and shaft. The nut is normally formed with a channel or raceway for encircling the shaft, and a cage or spacer is provided between the nut and shaft for positioning the bearing elements circumferentially about the shaft and in engagement with the raceway in the nut and the threads in the shaft.

The primary object of this invention is to produce an improved nut which can be manufactured economically.

Another object of this invention is to provide an improved cage or spacer for balls in a screw-and-nut actuator.

Another object of this invention is to provide an improved nut wherein a plurality thereof may be adjacently disposed.

Additional objects and attributes of the invention will become evident when the description hereinafter set forth is considered in conjunction with the accompanying drawings in which.

Figure 1:
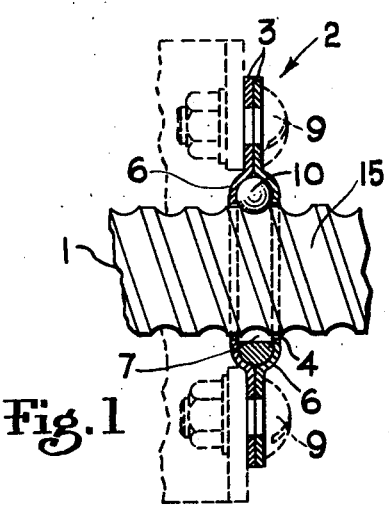
FIGURE 1 is a view of a portion of a threaded shaft with my improved nut assembly shown partially in section.
Figure 2:
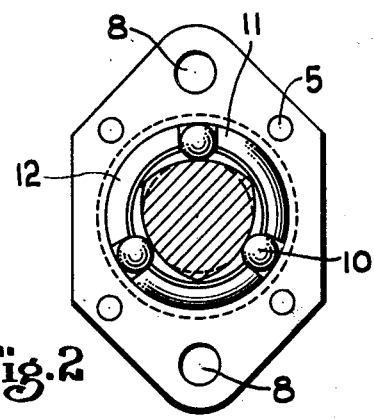
FIGURE 2 is a cross-sectional view showing part of the nut assembly on the shaft, one plate of the assembly being omitted for clarity.
Figure 3:
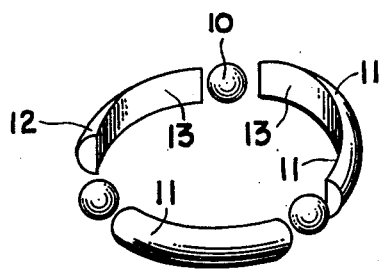
FIGURE 3 is a view of the spacer devices of FIGURES 1 and 2, removed from the nut body, showing their relation to the bearing elements.

Referring now to FIGURES 1–3 of the drawing, there is shown a threaded shaft or screw 1 of the multiple thread type. The number of threads is of importance, and for purpose of illustration shaft 1 is here shown as formed with triple lead threads. Obviously, the threads may be either right or left-handed, as preferred. A nut assembly 2 operatively engages the threaded shaft. The body of the nut assembly may be constructed as the exigencies dictate, including the form of a conventional nut body, or it may be moulded from powdered metal, etc. The essential characteristics for it are that the diameter of its opening or bore should somewhat exceed the diameter of the shaft, and that a circular race or channel formed in or contiguous said bore or opening receive the bearing elements hereinafter referred to.

As here illustrated in FIGURE 1, for economic reasons, the body 2 of the nut assembly unit is formed of a pair of inexpensive identical flat stampings or retainer members 3. Each member is formed with an opening 4 therethrough to receive the shaft, and the two members are secured together, as best shown in FIGURE 1, such as by spot welding, or by rivets passing through holes 5.

The portion of each retainer member about its shaft opening is flared or curved at 6 away from the plane of the member, so that the members when brought into the mating relation shown define a raceway or channel 7. Members 3 are of such area as to provide ample space for the rivets, and are also formed with holes 8 for bolts 9 used for attachment to the carriage to be traversed and/or for a cascade arrangement to be described hereinafter. Since retainer members 3 are identical, both retainer members can be produced from a single die, thus reducing production costs.

Three thrust-transmitting bearing elements, illustrated as balls, bearing elements or means 10, are disposed in channel 7, there being one such element for each thread lead of the shaft and since the shaft bears triple threads, bearing elements 10 are spaced approximately 120 degrees apart both to agree with the threads and in order to balance load transmittal from shaft to nut or vice versa.

For precisely spacing the bearing elements, I arrange within the trough of channel 7 a series of identical curved cage or spacer segments 11 of substantially semicircular cross section, the number of the segments corresponding to the bearing elements. The segments are arranged in channel 7 of the nut body in alternate relation to the bearing elements, and with the outer or rounded side 12 of each segment nested in the rounded trough of channel 7 and slidably around the periphery thereof. The cylindrical inner face of the segments is flat or trimmed back to provide slight clearance between the segments and the outside diameter of the shaft. Segments 11 preferably should be of a thickness exceeding half the diameter of the bearing elements so that the ends thereof will establish solid abutting contact with the elements, as shown in FIGURE 2.

Once received in channel 7, the segments and elements tend to stay in place, even during handling and the steps of installing the nut upon a shaft. For any tendency of either ball or segment, or both, to move radially inward at once reduces the normal circumference defined by these elements, similar to the principle of an arch, thus restraining the elements in the channel. The ends of the spacers terminate in a flat portion preferably cut at a slight angle so that the distance between the balls is slightly less at the inner periphery of the spacers.

In assembling the nut unit, where very close fit of segments and bearing elements is desired, these parts may be arranged between the retainer members before the latter are secured together. For most usages, however, a retaining fit for all the parts may be obtained by inserting the segments and all but one bearing element into channel 7 after the body 2 has been completed and snapping the last ball into position between a pair of spacers. To mount the unit upon a shaft, the segments and elements being provisionally in place, it is merely necessary to bring the bearing elements into registry with the grooves or threads terminating at an end of the shaft and thereupon introduce the unit upon the shaft in the same motions one would follow in applying a common nut.

Figure 6:
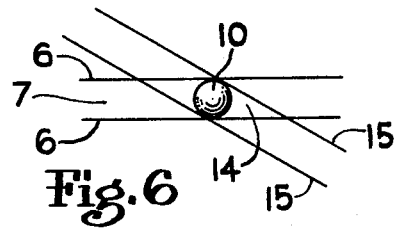
FIGURE 6 is a diagrammatic showing of the intersection of a groove of the shaft and the channel of the nut assembly and how pockets are thus formed for the bearing elements of FIGURES 1 and 5.

FIGURE 6 discloses a developed intersection 14 between thread 15 of shaft 1 and channel 7 of the nut body. A ball 10 is shown in such an intersection.

Figure 5:
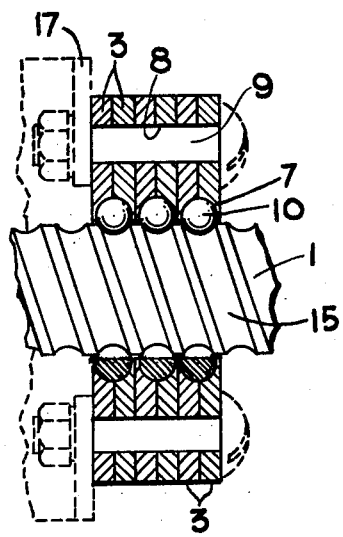
FIGURE 5 is a view of another form showing how nut units of plate material may be stacked or cascaded to handle loads beyond the capacity of the individual units.
Figure 4:
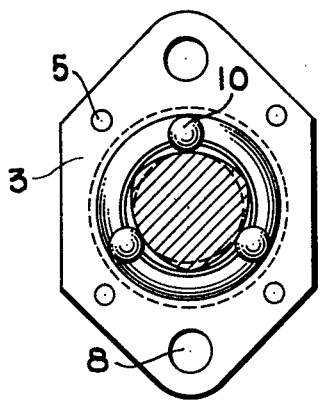
FIGURE 4 is a view corresponding to FIGURE 2, but without the spacers.

For situations where loads are too heavy for a single unit 2, or where longer life is desirable by reducing the load upon the single unit 2, several units, of either form of the invention above described, may be stacked or cascaded to spread the load over more bearing elements. In FIGURE 5, three units are shown fastened together by bolts 9 passing through the holes 8. Brackets 17 for connecting the units to a carriage to be traversed may be interposed between the nut units and bolt as shown. For the stacked arrangement, I preferably employ somewhat thicker plates 3 than illustrated in FIGURE 1, and round out the inner peripheral contiguous edges of the shaft opening of each unit to form the channel or complementary groove for the bearing elements 10. In this way both sides of each unit are flat throughout, thus establishing good contact of the units when stacked.

Screw 1, as shown, contains triple threads. That is to say that if a plane were passed through the screw normal to the axis thereof, it would cut through corresponding parts of three different threads. These corresponding parts would be mounted at approximately 120-degree intervals about the periphery of the screw. It can be seen that a peripheral groove 7 passing around nut member 7 (FIGURE 1 or 5) will pass over three different thread troughs defining an area wherein a ball could be received in such an insection in communication with both the thread trough 14 and groove 7. In the present description, a triple screw can contain three balls or bearing elements at 120-degree intervals about the periphery of the screw in a plane transverse to the axis thereof. Spacers or ring segments 11, located in groove 7 and between the bearing elements, aid in maintaining the bearing elements in properly spaced position.

Of course, a shaft having four or more threads will support a corresponding number of bearing elements around its periphery and obviously would require a different number of spacers or cage members. The spacers reside in the nut peripheral groove and has its inner portion cut away to clear the major diameter of threaded shaft 1.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:

1. A nut structure comprising a body having an opening therethrough for the free passage of a multiple thread shaft, a wall defining the opening having at least one annular groove encircling the shaft, a plurality of bearing means located in the groove and corresponding in number to the number of threads on the shaft, said bearing means received by the threads of the shaft to form a driving connection between the nut and shaft, and spacer means having portions slidably engaging said groove for spacing the bearing means peripherally about the shaft.

2. A nut structure comprising a body having a circular opening therethrough for the free passage of a multiple thread shaft, the wall defining the opening being formed with an annular groove encircling said shaft, a plurality of spacer ring segments each of the same curvature as said groove and corresponding in number to the threads of said shaft, said segments being substantially semicircular in cross section and nested in said groove with their rounded sides in contact with the bottom thereof, a ball disposed between and bridging the ends of adjoining segments, said balls projecting into the opening of said body and adapted to seat between the threads of said shaft defining a driving connection between the nut and the shaft.

3. A nut structure for use on a multiple thread shaft comprising; a body consisting of two mating members secured together in superposed relation, said members being formed with registering openings for passage of said threaded shaft, the edge portion of each member about said openings being flared to define an annular groove facing said shaft, a plurality of bearing means located in the groove corresponding in number to the number of threads on the shaft, said bearing means adapted to be received by the threads of the shaft to form a driving connection therebetween, and a plurality of independent spacer elements within said opening having portions slidably engaging said groove for spacing the bearing means peripherally about the shaft.

4. Spacer means for a nut structure designed for use with a multiple thread shaft, said nut structure having an opening therethrough and at least one annular groove formed in the wall of the opening, said groove encircling said shaft and receiving bearing elements in each groove for cooperation with the threads of said shaft to define a driving connection theebetween, said bearing elements corresponding in number to the number of threads on the shaft, means comprising a plurality of ring segments each of the curvature of said groove and slidably supported therein and corresponding in number to the threads of said shaft, said segments positioned between bearing elements to maintain the bearing elements spaced apart in said groove equidistant about the periphery of the nut opening.

5. In combination, a multiple thread shaft and a nut structure engaging the threads of said shaft, said structure comprising a body having a circular opening therethrough for passage of said shaft, the wall defining said opening being formed with at least one open raceway encircling said shaft in a plane normal to the axis of said shaft, bearing means which correspond in number to the threads of said shaft positioned in said raceway and engaging the threaded shaft thereby defining a driving connection therebetween, cage means disposed in said raceway adapted to retain the bearing means in spaced-apart relation about the periphery of the shaft and nut structure, said cage comprising a plurality of curved unitary spacer means substantially conforming to the shape of the raceway and in peripheral sliding contact therewith.

6. A nut assembly comprising a plurality of units in superposed relation, each unit consisting of a body formed of two flat metal plates in adjacent relation, an opening through said plates and an annular groove formed between the plates in said opening for encircling a threaded shaft, bearing elements in the groove consisting of one for each thread of said shaft, means spacing said bearing elements circumferentially of said groove and maintaining the bearing elements seated between threads of said shaft to define a driving connection between the nut and shaft, said spacer means consisting of a plurality of arcuate substantially semicircular elements conforming to the surface of the groove and in sliding contact therewith, and means for securing the plates and the units together.

7. A nut for use on multiple thread screws comprising: a body having a generally circumferential wall defining an opening therethrough for receiving a screw, said circumferential wall including at least one annular groove extending therearound, a plurality of bearing means in said groove, and means within said opening and generally conforming to the curvature of said annular groove for peripherally spacing said bearing means thereabout for driving engagement with the threading on said screw, said means slidably engaging the walls of said groove.

8. A nut for use on multiple thread screws comprising: a body having a generally circumferential wall defining an opening therethrough for receiving a screw, said circumferential wall including at least one closed peripheral groove extending therearound, a plurality of bearing means in said groove, a plurality of means substantially conforming to said groove both longitudinally and transversely and slidably disposed therein between said bearing means for spacing said bearing means peripherally of said opening for driving engagement with the threading on said screw.

References Cited by the Examiner

UNITED STATES PATENTS

| | | | |
|---|---|---|---|
| 2,215,791 | 9/40 | Horowitz | 74—459 |
| 2,445,384 | 7/48 | Bousky | 74—459 |
| 2,714,005 | 7/55 | Wise | 74—459 |
| 2,914,315 | 11/59 | Wise | 74—459 |
| 2,924,112 | 2/60 | Martens | 74—459 |
| 3,006,212 | 10/61 | Galonska | 74—459 |

FOREIGN PATENTS 725,181   9/42   Germany.

DON A. WAITE, *Primary Examiner.*

BROUGHTON G. DURHAM, *Examiner.*